(12) United States Patent
Gupta

(10) Patent No.: US 10,175,657 B2
(45) Date of Patent: Jan. 8, 2019

(54) METHOD AND SYSTEM FOR DETERMINING MAPPING OF TEST CASE(S) TO CODE SNIPPETS OF COMPUTER PROGRAM

(71) Applicant: Webomates LLC, Wilmington, DE (US)

(72) Inventor: Ruchika Gupta, Norwalk, CT (US)

(73) Assignee: Webomates LLC, Wilmington, DE (US)

( * ) Notice: Subject to any disclaimer, the term of this patent is extended or adjusted under 35 U.S.C. 154(b) by 113 days.

(21) Appl. No.: 15/194,488

(22) Filed: Jun. 27, 2016

(65) Prior Publication Data

US 2017/0371304 A1    Dec. 28, 2017

(51) Int. Cl.
| | |
|---|---|
| *G06F 9/44* | (2018.01) |
| *G05B 9/02* | (2006.01) |
| *G06F 11/36* | (2006.01) |
| *G05B 19/418* | (2006.01) |
| *G07C 3/00* | (2006.01) |
| *F16P 3/00* | (2006.01) |
| *G05B 15/02* | (2006.01) |
| *G06F 11/263* | (2006.01) |

(52) U.S. Cl.
CPC ............... *G05B 9/02* (2013.01); *F16P 3/00* (2013.01); *G05B 15/02* (2013.01); *G05B 19/418* (2013.01); *G06F 11/263* (2013.01); *G06F 11/3676* (2013.01); *G06F 11/3684* (2013.01); *G07C 3/00* (2013.01); *Y02P 90/02* (2015.11)

(58) Field of Classification Search
CPC .................................................. G06F 11/3676
See application file for complete search history.

(56) References Cited

U.S. PATENT DOCUMENTS

| | | | |
|---|---|---|---|
| 6,536,036 B1 | 3/2003 | Pavela | |
| 8,819,642 B2 | 8/2014 | Bhat et al. | |
| 2008/0172580 A1* | 7/2008 | Davia | G06F 11/3676 714/38.14 |
| 2008/0172655 A1 | 7/2008 | Davia | |
| 2010/0058295 A1* | 3/2010 | Johnson | G06F 11/3676 717/124 |
| 2013/0111267 A1 | 5/2013 | Beryoza et al. | |
| 2014/0229920 A1* | 8/2014 | Rossi | G06F 11/3664 717/125 |

OTHER PUBLICATIONS

Parasoft, Code Coverage Analysis retrieved date : Jun. 24, 2016.

* cited by examiner

*Primary Examiner* — Hang Pan
(74) *Attorney, Agent, or Firm* — HM Law Group LLP; Vani Moodley, Esq.

(57) ABSTRACT

Disclosed is a system for determining one or more lines of code uniquely executed corresponding to a plurality of test cases executed on a computer program of an IT enabled application. The system creates a plurality of test cases (either manually or automatically). The system further enables a test case execution tool and a code coverage tool. The test case execution tool executes each of the plurality of test cases on the plurality of lines of code. On the other hand, the code coverage tool monitors the one or more lines of code, of the plurality of lines of code, executed for each test case. Subsequently, the system further determines Test Case To Code Mapping (TCTCM) indicating a subset, of the plurality of lines of code, executed at least once by the test case execution tool upon execution of one or more test cases of the plurality of test cases.

11 Claims, 4 Drawing Sheets

METHOD AND SYSTEM FOR DETERMINING MAPPING OF TEST CASE(S) TO CODE SNIPPETS OF COMPUTER PROGRAM

PRIORITY INFORMATION

This patent application does not claim priority from any application.

TECHNICAL FIELD

The present subject matter described herein, in general, relates to correlating one or more test cases, executed on a computer program, with one or more User Interface (UI) elements present on one or more web-pages and code snippet(s).

BACKGROUND

One of the biggest challenges that have been observed in the field of software testing is to ensure quality of a software product before deploying the software product in a production environment. One way to ensure the quality is by testing each line of code of a computer program pertaining to the software product. For testing each line of code, a plurality of test cases may be created that tests functionality pertaining to each feature of the software product. However, the plurality of test cases may not always facilitate a software tester to test each line of code as there might be possibility that one or more test cases may test the lines of code that have been tested at least once upon execution of another test case. In other words, it is a cumbersome task for the software tester to know what functional and system level testing yields in terms of the amount of actual lines of code that has been covered by the one or more test cases. For example, one may have 100 Test cases or 1000 test cases and still may be covering only 10% of the total lines of code or 80% of the total lines of code. This may sometimes provide erroneous information to the software tester as some code snippets of the computer program may not be tested at all before deployment of the software product.

In addition to the above, since the software product has a plurality of features, the challenge is to find a way to map each feature and execution to a code snippet that implements such feature(s). There has been lot of traditional approaches where complex tools may be used to address the aforementioned challenges, however, such tools are associated with challenges that may include, but not limited to, accuracy, labor intensive, and management overhead.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for one or more lines of code uniquely executed corresponding to a plurality of test cases executed on a computer program of an IT enabled application and the concepts are further described below in the detailed description. This summary is not intended to identify essential features of the claimed subject matter nor is it intended for use in determining or limiting the scope of the claimed subject matter.

In one implementation, a system for determining one or more lines of code uniquely executed corresponding to a plurality of test cases executed on a computer program of an IT enabled application is disclosed. The system may comprise a processor and a memory coupled to the processor. The processor may execute a plurality of modules present in the memory. The plurality of modules may comprise a test case creation module, a tool enabling module, and a unique code execution determining module. The test case creation module may enable a user to create a plurality of test cases. In one aspect, each test case may be created (either manually or automatically) to test one or more lines of code of a plurality of lines of code pertaining to a computer program. The tool enabling module may enable a test case execution tool to execute each of the plurality of test cases on the plurality of lines of code. The tool enabling module may further enable a code coverage tool to monitor the one or more lines of code, of the plurality of lines of code, executed for each test case. The unique code execution determining module may determine Test Case To Code Mapping (TCTCM) indicating a subset of the plurality of lines of code executed at least once, by the test case execution tool, upon execution of one or more test cases of the plurality of test cases. In one aspect, the subset indicates uniquely executed lines of code corresponding to the computer program.

In another implementation, a method for determining one or more lines of code uniquely executed corresponding to a plurality of test cases executed on a computer program of an IT enabled application is disclosed. In order to determine the one or more lines of code that are uniquely executed, initially, a user may be enabled to create a plurality of test cases. In one aspect, each test case may be created (either manually or automatically) to test one or more lines of code of a plurality of lines of code pertaining to a computer program. Upon creating the plurality of test cases, a test case execution tool may be enabled to execute each of the plurality of test cases on the plurality of lines of code. Concurrently, a code coverage tool may be enabled to monitor the one or more lines of code, of the plurality of lines of code, executed for each test case. Subsequently, Test Case To Code Mapping (TCTCM) indicating a subset of the plurality of lines of code may be determined that has been executed at least once, by the test case execution tool, upon execution of one or more test cases of the plurality of test cases. In one aspect, the subset indicates uniquely executed lines of code corresponding to a computer program. In one aspect, the aforementioned method for determining the one or more lines of code uniquely executed corresponding to the one or more test cases executed on the computer program of the IT enabled application may be performed by a processor using programmed instructions stored in a memory.

In yet another implementation, non-transitory computer readable medium embodying a program executable in a computing device for determining one or more lines of code uniquely executed corresponding to one or more test cases, of a plurality of test cases, executed on a computer program of an IT enabled application is disclosed. The program may comprise a program code for enabling a user to create a plurality of test cases, wherein each test case is created (either manually or automatically) to test one or more lines of code of a plurality of lines of code pertaining to a computer program. The program may further comprise a program code for enabling a test case execution tool and a code coverage tool. The test case execution tool may be enabled to execute each of the plurality of test cases on the plurality of lines of code. The code coverage tool, on the other hand, may be enabled to monitor the one or more lines of code, of the plurality of lines of code, executed for each test case. The program may further comprise a program code for determining Test Case To Code Mapping (TCTCM) indicating a subset of the plurality of lines of code executed at least once, by the test case execution tool, upon execution of one or more test cases of the plurality of test cases, wherein the subset indicates uniquely executed lines of code corresponding to a computer program.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
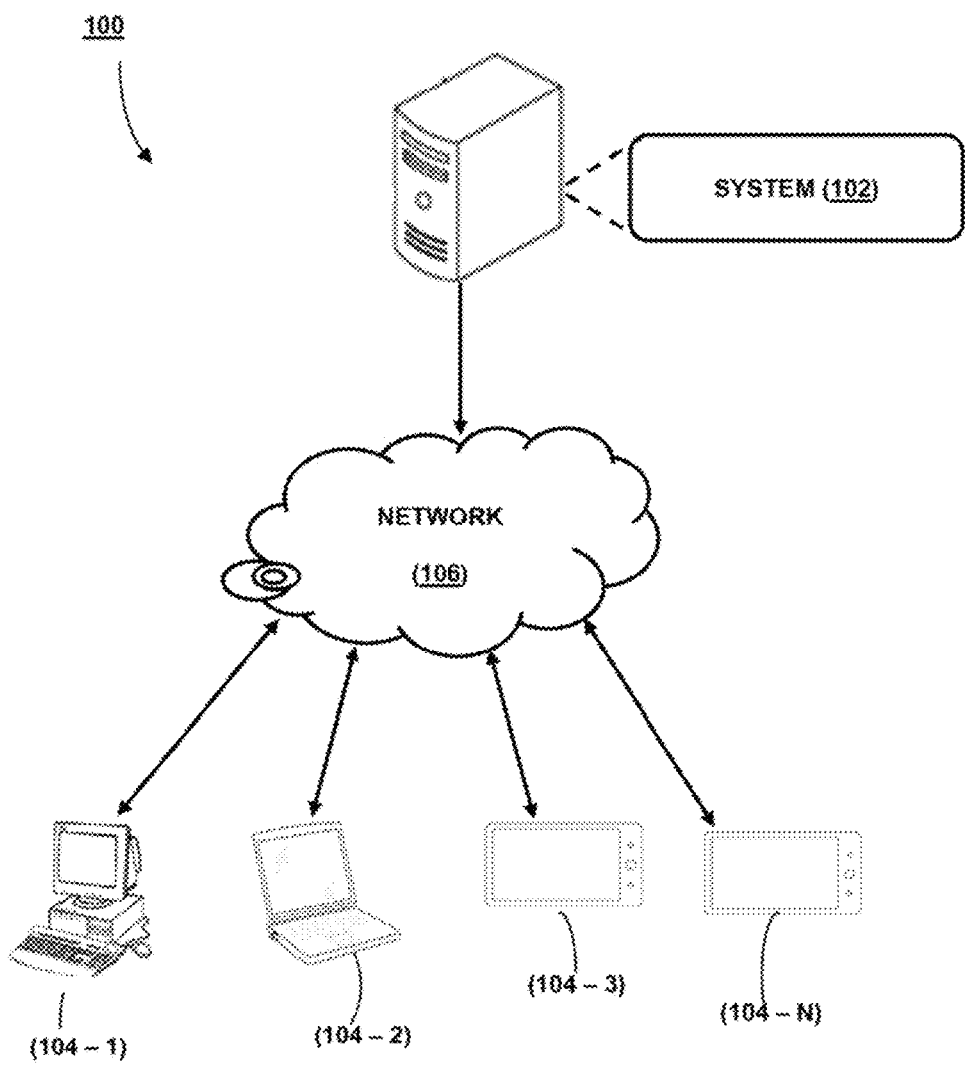
FIG. 1 illustrates a network implementation of a system for determining one or more lines of code uniquely executed corresponding to a plurality of test cases executed on a computer program of an IT enabled application, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

As there exist a challenge in the existing art to test each line of code of a computer program, the present invention as envisaged to create an automated approach to determine a Test Case To Code Mapping (TCTCM) based on determination of one or more lines of code that are uniquely executed corresponding to a plurality of test cases executed on a computer program. In one aspect, one or more test cases, of the plurality of test cases, are linked to one or more lines the code that is being executed, upon execution of the one or more test cases. Therefore, the TCTCM indicates mapping of a test case to one or more lines of code, of a plurality of lines of codes, or a module (indicating code snippets).

In one embodiment, the present invention is further envisaged to determine code coverage data comprising a percentage of the lines of code covered by the one or more test cases at a test case level, or a page level etc. In one aspect, the code coverage data further indicates a count of the one or more lines of code covered upon executing the one or more test cases.

In order to determine the Test Case to Code Mapping (i.e. linking of the one or more test cases and the one or more lines the code) and thereby determining code coverage data, a plurality of test cases may be created (either manually or automatically) by a user. In one embodiment, the plurality of test cases may be configured to perform regression testing on the computer program. Each test case may be created to test one or more lines of code of a plurality of lines of code pertaining to the computer program. Upon creating the plurality of test cases, each of the plurality of test cases may be executed on the plurality of lines of code. In one embodiment, the plurality of test cases may be executed (either automatically or manually) by using a test case execution tool. Concurrently, a code coverage tool may be enabled to monitor the one or more lines of code, of the plurality of lines of code, executed for each test case. Examples of the test case execution tool may include, but not limited to, Quick Test Professional (QTP™) and Selenium™.

After concurrently executing the plurality of test cases (either automatically by enabling the test case execution tool or manually) and the code coverage tool, Test Case To Code Mapping (TCTCM) indicating a subset of the plurality of lines of code corresponding to the computer program may be determined. In one aspect, the subset comprises lines of code that have been executed at least once upon execution of the one or more test cases. In one aspect, the subset indicates uniquely executed lines of code corresponding to the computer program. The TCTCM indicates mapping of each test case to the one or more lines of code or a module (indicating code snippets) being executed by respective test case.

In one embodiment, the present invention further determines the code coverage data corresponding to the one or more test cases. The code coverage data may be determined based on the subset and the plurality of lines of code. In one aspect, the code coverage data may be determined based on comparison of the subset and the plurality of lines of code. In one embodiment, the code coverage data may be determined for one or more User Interface (UI) elements present on one or more web-pages pertaining to the IT enabled application.

Thus, in this manner, the present invention provides a method and a system to determines the TCTCM based on determination of the one or more lines of code that are uniquely executed corresponding to the plurality of test cases executed on the computer program of the IT enabled application. The TCTCM may further be used to determine the code coverage data.

While aspects of described system and method for determining the one or more lines of code corresponding to the plurality of test cases, executed on the computer program of the IT enabled application and may be implemented in any number of different computing systems, environments, and/or configurations, the embodiments are described in the context of the following exemplary system.

Referring now to FIG. 1, a network implementation 100 of a system 102 for determining one or more lines of code uniquely executed corresponding to a plurality of test cases executed on a computer program of an IT enabled application is disclosed. In order to determine the one or more lines of code that are uniquely executed, initially, the system 102 enables a user to create a plurality of test cases (either manually or by using a test case execution tool). Upon creation of the plurality of test cases, the system 102 enables execution of each test case and a code coverage tool. The test case execution tool executes each of the plurality of test cases on the plurality of lines of code. The code coverage tool, on the other hand, monitors the one or more lines of code, of the plurality of lines of code, executed for each test case. Subsequently, the system 102 determines Test Case To Code Mapping (TCTCM) indicating a subset, of the plurality of lines of code, executed at least once, by the test case execution tool, upon execution of one or more test cases of the plurality of test cases. In one aspect, the subset indicates the uniquely executed lines of code corresponding to a computer program.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
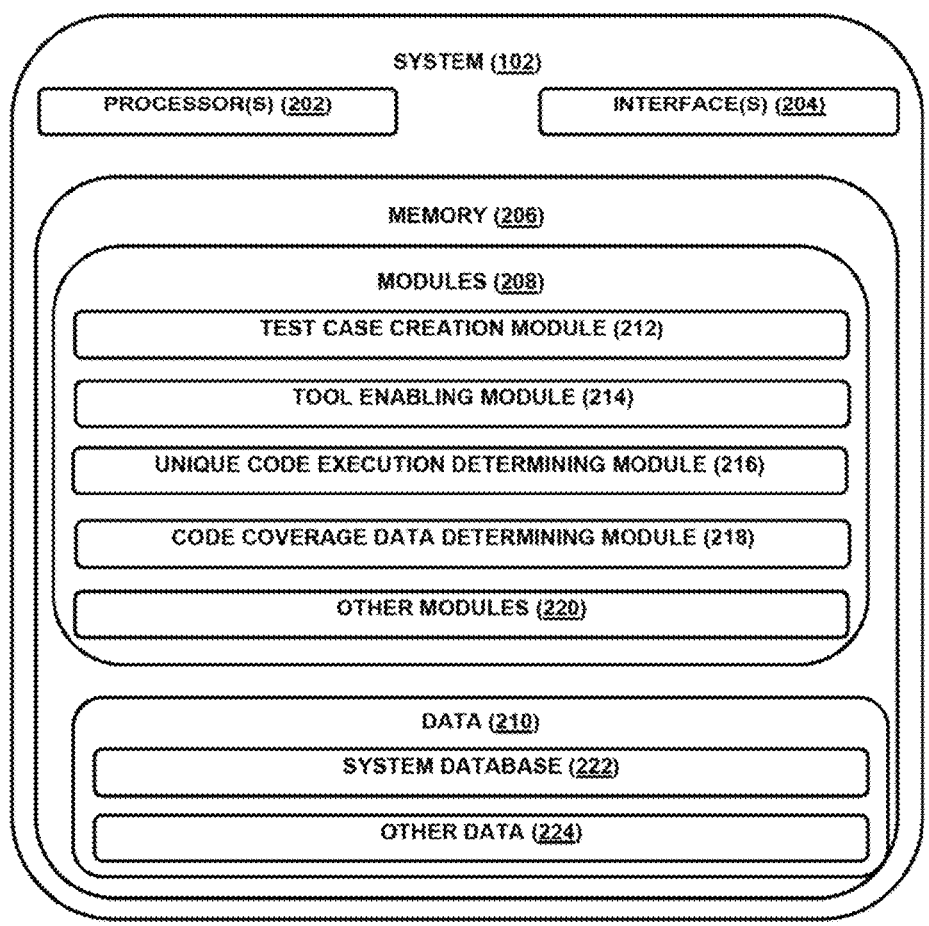
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a test case creation module 212, a tool enabling module 214, a unique code execution determining module 216, a code coverage data determining module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the system 102 for determining one or more lines of code that are uniquely executed corresponding to a plurality of test cases executed on a computer program of an IT enabled application. In order to determine the one or more lines of code that case. In one aspect, the plurality of test cases may include positive test cases and negative test cases. In one example, the test case matrix is illustrated below in Table 1:

| Name of a test case | Page of the IT enabled application to be tested | Test Requirements | Functionality | Test case |
|---|---|---|---|---|
| Enter Login credentials | Login Page | Username should contain letter, number and period. Username should not be left blank. Username should not be more than 40 characters. Username should not start with or contain say symbols. Password should be at least 6 characters. Password should contain combination of letter, numbers and symbols. Password should not contain spaces and period. Password should not be more than 40 characters. | Does the login form works successfully? Is logout link redirects back to the login screen? Is logout link functional? Does forgot password link works? Does it redirect to valid password recovery page? Do forward and backward buttons work properly while logged in? and also for logged out user? Does form works similar in every popular browser? How errors are handled and displayed? | Enter valid username and password Enter valid username and invalid password. Keep username blank and enter password Keep password blank and enter username Enter username and password wrong |
| Forgot Password | Login Page | Same as above | Same as above | Click on forgot password link and retrieve the password for the username. |
| Register link | Login Page | Same as above | Same as above | Click on register link and fill out the form and register username and password. |
| Submit Button | Login Page | Same as above | Same as above | Keep both field(s) blank and hit enter or click Submit button. Use enter button after typing correct username and password. | are uniquely executed, at first, a user (hereinafter may also referred to as a software developer) may use the client device 104 to access the system 102 via the I/O interface 204. The user may register them using the I/O interface 204 in order to use the system 102. In one aspect, the user may access the I/O interface 204 of the system 102. The system 102 may employ the test case creation module 212, the tool enabling module 214, the unique code execution determining module 216, and the code coverage determining module 218. The detail functioning of the modules are described below with the help of figures.

In order to create the plurality of test cases, a software tester may define a test case matrix comprising name of a test case, page of the IT enabled application to be tested, test requirements pertaining to each page, functionality and test case. It may be understood that each test case may include a list of test steps. In one aspect, a test step indicates an action to be performed and an expected response received from the IT enabled application. For example: the action may be: Type a password in a text box and expected response should be: Your password should be masked as dotted and/or hidden.

Upon defining the test case matrix, the test case creation module 212 may enable the user to create the plurality of test cases. It may be understood that the plurality of test case may be created either manually (by the software tester) or automatically by using at least one test generation tool. Examples of the at least one test generation tool may include, but not limited to, Bender RBT™ and Ravenflow™. It may be understood that each test case may be created to test one or more lines of code, of a plurality of lines of code, pertaining to the computer program.

In one embodiment, the plurality of test cases created may be configured to perform regression testing on the computer program. It may be understood that the regression testing may be performed on one or more User Interface (UI) elements/features, present on one or more web-pages of the IT enabled application, a package, or a module.

Upon creating the plurality of test cases, a tool enabling module 214 may concurrently enable execution of each test case (either manually or by using a test case execution tool) and a code coverage tool. In one aspect, the test case execution tool may be enabled to execute each of the plurality of test cases on the plurality of lines of code. The code coverage tool, on the other hand, may be enabled to monitor the one or more lines of code, of the plurality of lines of code, executed for each test case. In other words, the concurrent enabling of the test case execution tool and the code coverage tool facilitates the software tester to keep track of which lines of code are covered upon execution of each respective test case.

Figure 3:
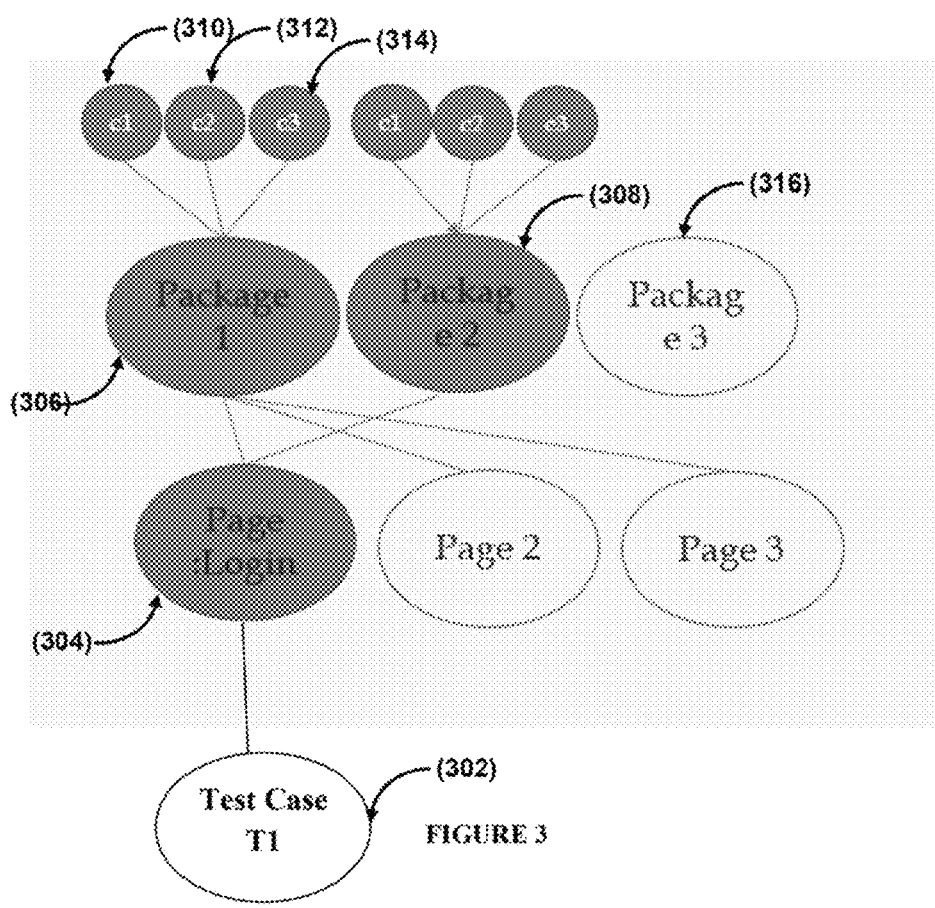
FIG. 3 illustrates examples, in accordance with an embodiment of the present subject matter.

In order to explain, consider an example where a bubble diagram, in FIG. 3, illustrates a plurality of web-pages of an IT enabled application. It may be understood that each web-page of the IT enabled application is to be tested before deploying the IT enabled application in a production environment. In order to keep track of which lines of code are covered upon execution of a test case, consider a web-page as 'Login page' (304) to be tested. Since the 'Login page' (304) includes one or more features such 'User Authentication', 'Password Masking' etc., it may be understood that code corresponding to each feature of the 'Login page' (304) is coded in a form of one or more software packages. The one or more software packages further comprises one or more classes, wherein each class corresponds to a specific functionality pertaining to each feature. It may be noted that the software package, including the one or more classes, comprise a plurality of lines of code in a specific programming and/or scripting language such as Java, C, or C++. As shown in the FIG. 3, upon execution of a Test Case T1 (302) on the Login Page (304), Package 1 (306) and Package 2 (308) are executed. Upon execution of Package 1 (306) and Package 2 (308), one or more classes are further invoked and executed. In this example, Class C1 (310), C2 (312), and C3 (314) corresponding to Package 1 (306) and Package 2 (308) are executed, when the Test Case T1 (302) is executed to test the 'Login page' (304). Similarly, upon execution of a Test Case T2 (not shown in the figure) on the Login Page (304), Package 2 (308) and Package 3 (316) may be executed. Upon execution of the Package 2 and Package 3, one or more classes (i.e. Class C2 and C3) may be invoked and executed. Thus, in this manner, the concurrent enabling of the test case execution tool and the code coverage tool facilitates the software tester to keep track of which lines of code are covered upon execution of each respective test case.

In order to further elucidate the functionality of the tool enabling module 214, consider an example where 5 test cases (i.e. $TC_1$, $TC_2$, $TC_3$, $TC_4$, and $TC_5$) are created to test 1000 lines of code (i.e. $L_1$, $L_2$, $L_3$, $L_4$, ..., $L_{999}$, and $L_{1000}$) of a computer program pertaining to an IT enabled application. Upon execution of $TC_1$, it may be understood that first 50 lines of code (i.e. $L_1$, $L_2$, $L_3$, $L_4$ ..., $L_{49}$, and $L_{50}$) are covered. Similarly, $TC_2$ covers first 100 lines of code (i.e. $L_1$, $L_2$, $L_3$, $L_4$ ..., $L_{99}$, and $L_{100}$), $TC_3$ covers first 200 lines of code (i.e. $L_1$, $L_2$, $L_3$, $L_4$ ..., $L_{199}$, and $L_{200}$), $TC_4$ covers first 150 lines of code (i.e. $L_1$, $L_2$, $L_3$, $L_4$ ..., $L_{149}$, and $L_{150}$), and $TC_5$ covers last 400 lines of code (i.e. $L_{601}$, $L_{602}$, $L_{603}$, $L_{604}$ ..., $L_{999}$, and $L_{1000}$).

From the above example, it may be understood that the plurality of test cases (i.e. $TC_1$, $TC_2$, $TC_3$, $TC_4$, and $TC_5$) may not always facilitate the software tester to test each line of code as some lines of code may be executed repetitively at least once by at least one of $TC_1$, $TC_2$, $TC_3$, $TC_4$, and $TC_5$. By concurrent enabling the test case execution tool and the code coverage tool facilitates, the software tester keeps track of the lines of code that have been executed at least once by another test case amongst $TC_1$, $TC_2$, $TC_3$, $TC_4$, and $TC_5$. Since each line of code of the computer program should be tested in order to ensure the quality of the IT enabled application before deployment at the production environment, it becomes utmost critical for the software tester to determine the code coverage data indicating the lines or code covered along with uncovered lines of code so that the plurality of test cases may be optimized to cover such uncovered lines of code.

In order to determine Test Case To Code Mapping (TCTCM) indicating a subset of the plurality of lines of code executed at least once, the unique code execution determining module 216 determines the subset based on determination of one or more lines of code that are uniquely executed corresponding to the plurality of test cases executed on the computer program. In one aspect, the subset indicates a set of lines of code that has been executed at least once, by the test case execution tool, upon execution of one or more test cases of the plurality of test cases. In one aspect, the subset indicates uniquely executed lines of code corresponding to the computer program.

In order to elucidate the functioning of the unique code execution determining module 216, consider the same example as aforementioned where the subset determined for $TC_1$ is first 50 lines of code (i.e. $L_1$, $L_2$, $L_3$, $L_4$ ..., $L_{49}$, and $L_{50}$) out of 1000 lines of code (i.e. $L_1$, $L_2$, $L_3$, $L_4$ ..., $L_{999}$, and $L_{1000}$) of the computer program. In another example, the subset determined upon execution $TC_2$ and $TC_4$ is aggregation of first 100 lines of code (i.e. $L_1$, $L_2$, $L_3$, $L_4$ ..., $L_{99}$, and $L_{100}$) and first 150 lines of code (i.e. $L_1$, $L_2$, $L_3$, $L_4$ ..., $L_{149}$, and $L_{500}$) respectively. The result of the aggregation is first 150 lines of code as the first 100 lines of code, pertaining to $TC_2$, are executed at least once while executing $TC_4$ therefore the subset of $TC_2$ and $TC_4$ is first 150 lines of code (i.e. $L_1$, $L_2$, $L_3$, $L_4$ ..., $L_{149}$, and $L_{150}$) out of 1000 lines of code (i.e. $L_1$, $L_2$, $L_3$, $L_4$ ..., $L_{99}$, and $L_{100}$).

In yet another example, the subset determined for $TC_1$, $TC_2$, $TC_3$, $TC_4$, and $TC_5$ is aggregation of first 50 lines of code, first 100 lines of code, first 200 lines of code, first 150 lines of code, and last 400 lines of code respectively. The result of the aggregation is 600 lines of code as the first 50 lines of code, first 100 lines of code, and first 150 lines of code, pertaining to $TC_1$, $TC_2$, and $TC_4$ respectively are executed at least once while executing $TC_3$ covering the first 200 lines of code (i.e. $L_1$, $L_2$, $L_3$, $L_4$ ..., $L_{199}$, and $L_{200}$). On the hand, last 400 lines of code (i.e. $L_{601}$, $L_{602}$, $L_{603}$, $L_{604}$ ..., $L_{999}$, and $L_{1000}$) are covered upon execution of $TC_5$ and not covered by any of $TC_1$, $TC_2$, $TC_3$, and $TC_4$. Therefore, the result of the aggregation is 600 lines of code (i.e. $L_1$, $L_2$, $L_3$, ..., $L_{200}$, $L_{601}$, $L_{602}$, $L_{603}$, ..., $L_{999}$, and $L_{1000}$) including first 200 lines of covered by $TC_1$, $TC_2$, $TC_3$, and $TC_4$ and last 400 lines of covered by $TC_5$. Thus, in this manner, the subset of the plurality of lines of code comprises lines of code executed at least once may be determined by the unique code execution determining module 216.

Thus, in this manner, the unique code execution determining module 216 determines the Test Case To Code Mapping (TCTCM) indicating the subset of the plurality of lines of code that are executed at least once, by the test case execution tool, upon execution of one or more test cases of the plurality of test cases.

In one embodiment, after determining the one or more lines of code that are uniquely executed, the code coverage data determining module 218 determines the code coverage data corresponding to the one or more test cases based on the TCTCM. In one aspect, the code coverage data may be determined for one or more User Interface (UI) elements present on one or more web-pages pertaining to the IT enabled application. The code coverage data indicates a count of the one or more lines of code covered upon executing the one or more test cases. In one embodiment, the code coverage data determining module 218 further determines a percentage of the code coverage data. The percentage may be determined based on comparison of the subset and the plurality of lines of code.

In order to determine the percentage of the code coverage data pertaining to each test case, consider the same example as aforementioned where the percentage of the code coverage data pertaining to $TC_1$ is determined based on the subset (i.e. 50 lines of code) and the plurality of lines of code (i.e. 1000 lines of code). Since 50 lines of code are covered out 1000 lines of code, the percentage of the code coverage data pertaining to $TC_1$ is determined as 5%. Similarly, the percentage of the code coverage data pertaining to $TC_2$, $TC_3$, $TC_4$, and $TC_5$ are determined as 10%, 20%, 15%, and 40% respectively. On the other hand, when all the test cases (i.e. $TC_1$, $TC_2$, $TC_3$, $TC_4$, and $TC_5$) are concurrently executed on the computer program comprising 1000 lines of code, the percentage of the code coverage data pertaining to $TC_1$, $TC_2$, $TC_3$, $TC_4$, and $TC_5$ is 60%. Thus, based on the above, the code coverage data determining module 218 determines the exact percentage of the code coverage data corresponding to the one or more test cases facilitates the software tester to keep track of which set of lines of code have been covered and uncovered upon execution of the one or more test cases individually or in combination.

Figure 4:
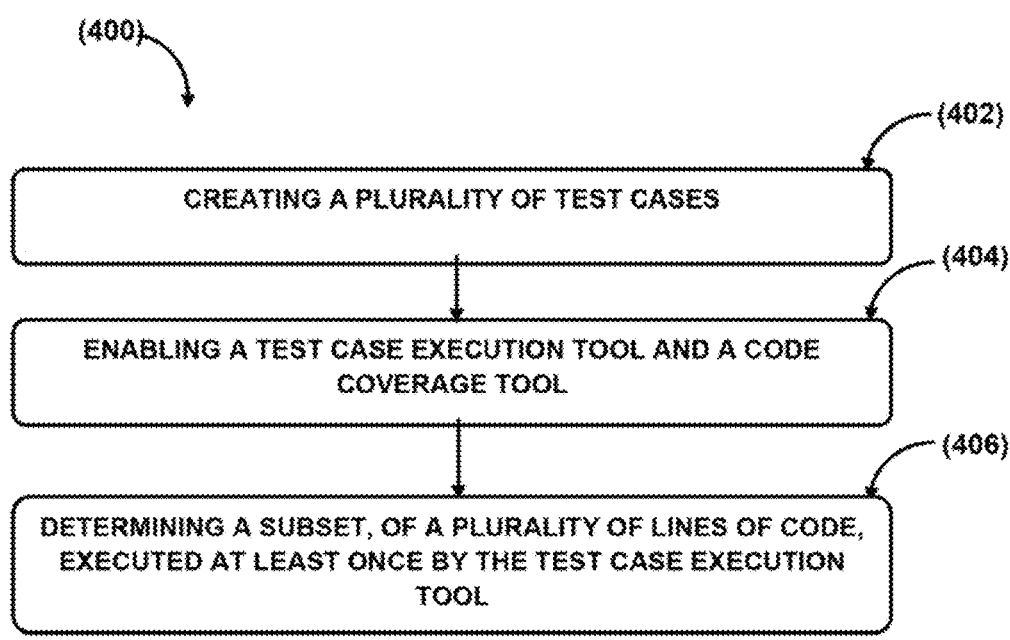
FIG. 4 illustrates a method for determining the one or more lines of code uniquely executed corresponding to the plurality of test cases executed on the computer program of the IT enabled application, in accordance with an embodiment of the present subject matter.

Referring now to FIG. 4, a method 400 for determining one or more lines of code uniquely executed corresponding to a plurality of test cases executed on a computer program of an IT enabled application is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a user may be enabled to create a plurality of test cases. In one aspect, each test case may be created (either automatically or manually) to test one or more lines of code of a plurality of lines of code pertaining to the computer program. In one implementation, the plurality of test cases may be created by the test case creation module 212.

At block 404, a test case execution tool and a code coverage tool may be enabled. In one aspect, the test case execution tool may be enabled to execute each of the plurality of test cases on the plurality of lines of code. In one aspect, the code coverage tool may be enabled to monitor the one or more lines of code, of the plurality of lines of code, executed for each test case. In one implementation, the test case execution tool and the code coverage tool may be enabled by the tool enabling module 214.

At block 406, Test Case To Code Mapping (TCTCM) indicating a subset of the plurality of lines of code that has been executed at least once may be determined, by the test case execution tool, upon execution of one or more test cases of the plurality of test cases. The subset indicates uniquely executed lines of code corresponding to the computer program In one aspect, the subset may be associated to one or more test cases, of the plurality of test cases, configured to test a page/view, a module, a package, functionality, and the like associated with the computer program. In one implementation, subset of the plurality of lines of code may be determined by the unique code execution determining module 216.

Exemplary embodiments discussed above may provide certain advantages. Though not required to practice aspects of the disclosure, these advantages may include those provided by the following features.

Some embodiments enable a system and a method to accurately determine a percentage of code coverage data upon execution of one or more test cases of a plurality of test cases.

Some embodiments enable a system and a method to concurrently enable a test case execution tool and a code coverage tool, wherein the concurrently enabling the test case execution tool and the code coverage tool facilitate to monitor each line of code covered by which test case(s) of the plurality of test cases.

Some embodiments enable a system and a method to facilitate a software tester in optimizing the plurality of test cases in a manner such that uncovered lines of code should also be covered while executing the one or more test case of the plurality of test cases.

Although implementations for methods and systems for determining one or more lines of code uniquely executed corresponding a plurality of test cases executed on the computer program of the IT enabled application have been described in language specific to structural features and/or methods, it is to be understood that the appended claims are not necessarily limited to the specific features or methods described. Rather, the specific features and methods are disclosed as examples of implementations for determining the one or more lines of code uniquely executed.

I claim:

1. A method for determining one or more lines of code uniquely executed corresponding to a plurality of test cases executed on a computer program of an IT enabled application, the method comprising:

enabling, by a processor, a user to create a plurality of test cases, wherein each test case is created to test one or more lines of code of a plurality of lines of code pertaining to a computer program;

concurrently enabling, by the processor,
- a test case execution tool to execute each of the plurality of test cases on the plurality of lines of code, and
- a code coverage tool to monitor the one or more lines of code, of the plurality of lines of code, executed for each test case and uncovered lines of code, wherein the concurrently enabling of the test case execution tool and the code coverage tool enables to optimize the plurality of test cases for execution of the uncovered lines of code; and determining, by the processor, Test Case To Code Mapping (TCTCM) indicating a subset of the plurality of lines of code executed at distinct levels, wherein distinct levels comprise a test case level, a feature level, a package level, a module level, a web-page level, and a system level, and wherein the subset is executed at least once upon execution of one or more test cases of the plurality of test cases, wherein the subset indicates uniquely executed lines of code corresponding to a computer program at distinct levels.

2. The method of claim 1, wherein the one or more lines of code are determined for one or more User Interface (UI) elements present on one or more web-pages pertaining to the IT-enabled application.

3. The method of claim 1 further comprising determining, by the processor, code coverage data corresponding to the one or more test cases, wherein the code coverage data is determined based on the TCTCM.

4. The method of claim 3, wherein the code coverage data indicates a count of the one or more lines of code covered upon executing the one or more test cases.

5. The method of claim 1 further comprising determining, by the processor, a percentage of the code coverage data, wherein the percentage is determined based on comparison of the subset and the plurality of lines of code.

6. A system for determining one or more lines of code corresponding to one or more test cases, of a plurality of test cases, executed on a computer program of an IT enabled application, the central control unit comprising:
- a processor; and
- a memory coupled to the processor, wherein the processor is capable of executing a plurality of modules stored in the memory, and wherein the plurality of modules comprising:
  - a test case creation module for enabling a user to create a plurality of test cases, wherein each test case is created to test one or more lines of code of a plurality of lines of code pertaining to a computer program;
  - a tool enabling module for concurrently enabling
    - a test case execution tool to execute each of the plurality of test cases on the plurality of lines of code, and
    - a code coverage tool to monitor the one or more lines of code, of the plurality of lines of code, executed for each test case and uncovered lines of code,
  - wherein the concurrently enabling of the test case execution tool and the code coverage tool enables to optimize the plurality of test cases for execution of the uncovered lines of code; and
  - a unique code execution determining module for determining Test Case To Code Mapping (TCTCM) indicating a subset of the plurality of lines of code executed at distinct levels, wherein distinct levels comprise a test case level, a feature level, a package level, a module level, a web-page level, and a system level, and wherein the subset is executed at least once upon execution of one or more test cases of the plurality of test cases, wherein the subset indicates uniquely executed lines of code corresponding to a computer program at distinct levels.

7. The system of claim 6, wherein the one or more lines of code, that are uniquely executed, are determined for one or more User Interface (UI) elements present on one or more web-pages pertaining to the IT-enabled application.

8. The system of claim 6 further comprising a code coverage determining module for determining code coverage data corresponding to the one or more test cases, wherein the code coverage data is determined based on the TCTCM.

9. The system of claim 8, wherein the code coverage data indicates a count of the one or more lines of code covered upon executing the one or more test cases.

10. The system of claim 6 further comprising determining a percentage of the code coverage data by a code coverage determining module, wherein the percentage is determined based on comparison of the subset and the plurality of lines of code.

11. A non-transitory computer readable medium embodying a program executable in a computing device for determining one or more lines of code corresponding to a plurality of test cases, executed on a computer program of an IT enabled application, the program comprising a program code:
- a program code for enabling a user to create a plurality of test cases, wherein each test case is created to test one or more lines of code of a plurality of lines of code pertaining to a computer program;
- a program code for concurrently enabling
  - a test case execution tool to execute each of the plurality of test cases on the plurality of lines of code, and
  - a code coverage tool to monitor the one or more lines of code, of the plurality of lines of code, executed for each test case and uncovered lines of code,
- wherein the concurrently enabling of the test case execution tool and the code coverage tool enables to optimize the plurality of test cases for execution of the uncovered lines of code; and
- a program code for determining Test Case To Code Mapping (TCTCM) indicating a subset of the plurality of lines of code executed at distinct levels, wherein distinct levels comprise a test case level, a feature level, a package level, a module level, a web-page level, and a system level, and wherein the subset is executed at least once upon execution of one or more test cases of the plurality of test cases, wherein the subset indicates uniquely executed lines of code corresponding to a computer program at distinct levels.

* * * * *